R. PRIEST.
FOLDING SHIPPING CRATE.
APPLICATION FILED AUG. 7, 1911.
1,020,447.
Patented Mar. 19, 1912.
2 SHEETS—SHEET 1.
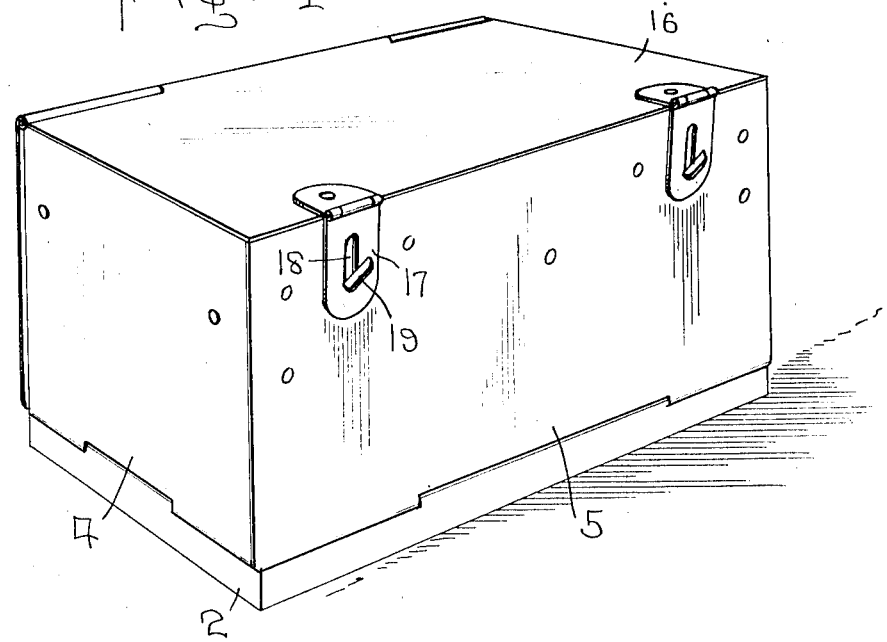
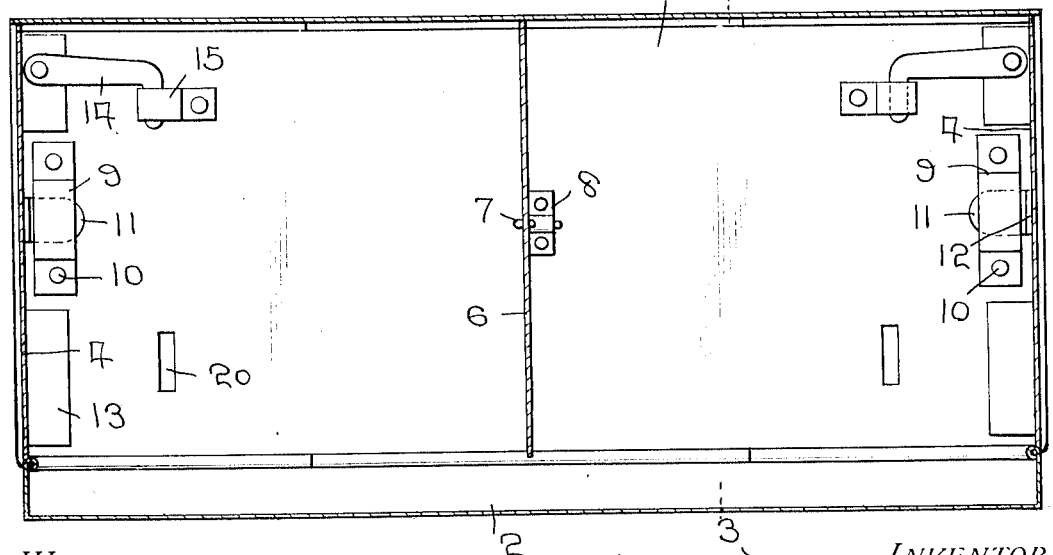
WITNESSES:
INVENTOR
R. Priest
BY W. J. FitzGerald & Co.,
Attorneys R. PRIEST.
FOLDING SHIPPING CRATE.
APPLICATION FILED AUG. 7, 1911.
1,020,447.
Patented Mar. 19, 1912.
2 SHEETS—SHEET 2.
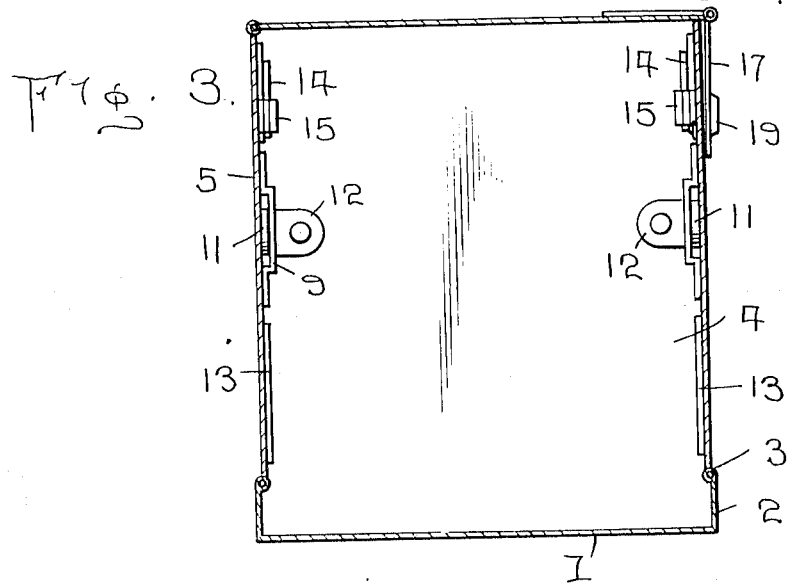
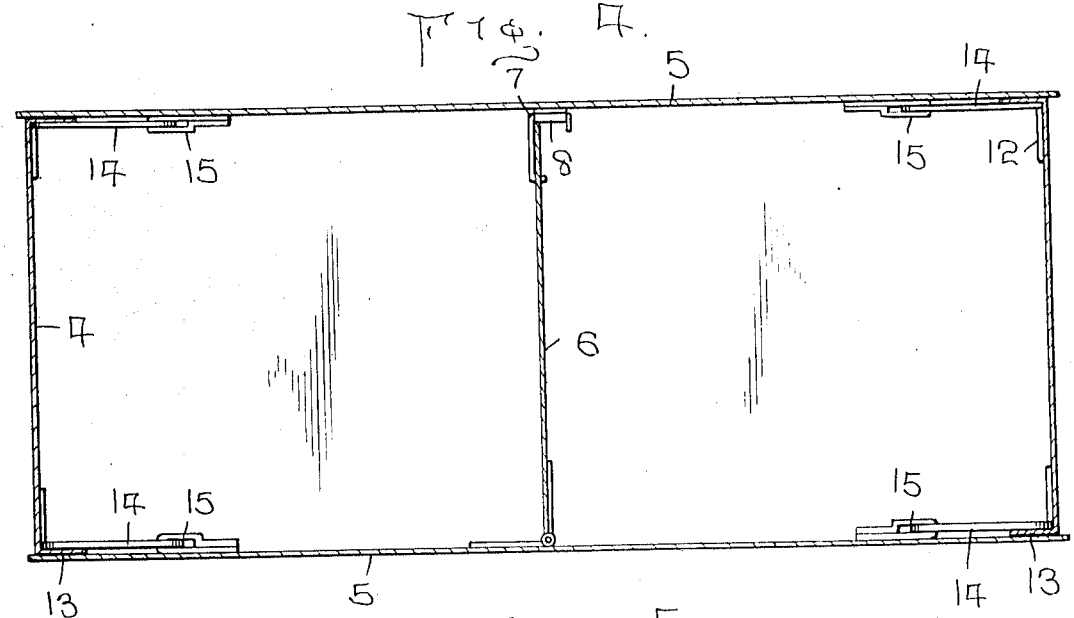
WITNESSES:
INVENTOR
R. Priest
BY W. J. Fitzgerald & Co.,
Attorneys

UNITED STATES PATENT OFFICE.

RANDEL PRIEST, OF AMES, COLORADO.

FOLDING SHIPPING-CRATE.

1,020,447.  Specification of Letters Patent.  Patented Mar. 19, 1912.

Application filed August 7, 1911. Serial No. 642,700.

*To all whom it may concern:*

Be it known that I, RANDEL PRIEST, citizen of the United States, residing at Ames, in the county of San Miguel and State of Colorado, have invented certain new and useful Improvements in Folding Shipping-Crates; and I do hereby declare the following to be a full, clear, and exact description of the invention, such as will enable others skilled in the art to which it appertains to make and use the same.

This invention relates to folding crates, and more particularly to that class of crates especially designed for shipping eggs.

An object of the invention is to provide an egg crate which may be readily folded into compact form after the removal of the contents.

Another object is to provide a collapsible egg crate having all of the parts connected and arranged to be folded upon one another, said parts carrying means for securing the same in proper relative positions to one another to accommodate eggs or the like for shipping purposes.

Another object is to provide an egg crate of the above stated kind, the sides and ends of which are hingedly connected to the up turned edges of the bottom, and the top secured to one of the long sides, and means for locking the opposite edge of the top to the opposite side when the top is resting upon the upper edges of the sides and ends of the crate.

Another object is to provide a crate of this character provided with a central partition hinged to one of the sides and adapted to be hooked to the opposite side to divide the crate into two compartments, and means carried by the sides near the ends of the crate to be engaged by the hooks and tongues carried by the ends to support the sides and ends of the crate in upright positions.

Other objects and advantages will be hereinafter set forth and pointed out in the specification and claim.

Figure 1 is a perspective view of the crate in set up position, the cover being closed and locked. Fig. 2 is a longitudinal vertical section therethrough. Fig. 3 is a vertical sectional view on the line 3—3 of Fig. 2. Fig. 4 is a horizontal cross sectional view, and Fig. 5 is a cross sectional view of the crate in folded position.

Referring particularly to the drawings Fig. 1 represents the bottom of the crate having the up turned edges 2 which are turned at their central portions to accommodate the hinge pins 3 which also pass through the turned lower edges of the ends 4 and sides 5. It will be understood that the bottom is preferably oblong, having two short ends and two long sides.

Hinged to one of the sides 5 about midway the ends thereof, and adapted for horizontal swinging movement when the side is in upright position, is the partition 6 which may be temporarily held transversely of the crate by means of the member 7 which is hinged to the opposite side 5 and has its free end bent for engagement within a suitable opening in the adjacent free edge of the partition 6, when the latter is positioned at right angles to the sides 5. The latch member 7 may be hinged to the side 5 by having a portion thereof passed under the plate 8 riveted or otherwise fastened to said side.

Positioned along the short edges of the sides 5 are the plates 9 which are secured at their opposite ends by rivets or other suitable means 10 to the sides, and have their central portions pressed outwardly to receive therebeneath the tongues 11 which have right angled portions 12 secured to the ends 4 along the vertical edges thereof, after the crate is in set up position to receive the eggs or the like, as will be understood.

To either side of the tongues 11, the ends 4 are provided with the right angle extensions 13 against which the short edges of the sides 5 are adapted to rest when the tongues 11 are engaged beneath the plates 9. Pivoted to one of the extensions 13 along each side edge of the ends 4 is a hook 14, the turned free end of which is adapted for engagement within a loop 15 which is riveted or otherwise fastened to the sides 5, preferably near the upper corners thereof.

Hinged to the upper edge or free long edge of one of the sides 5 is one edge of the top or cover 16 which has secured along its opposite edge the two part hasps 17, the free swinging portions of which are adapted to be swung against the side 5 opposite the side to which the cover is hinged, said swinging portions of the hasps being provided with elongated slots 18 to accommodate the locking pins 19 which may be readily turned or rotated, to engage over the hasps 17 and prevent the same from being disengaged from the side 5 to allow the cover 16 to raise and the contents of the box to be jolted out.

In folding this crate the ends 4 are preferably swung inwardly upon their hinges before the side carrying the partition 6 and locking pins 10 is folded downward, allowing this side to rest upon the outer faces of the ends 4. The opposite side 5, carrying the cover 16 is then folded upon the first side and the cover 16 folded back upon the outer face of the side to which it is connected. It will be understood that the free portions of the hasps 17 are folded back upon their stationary portions and that the side 5 to which the cover 16 is connected is provided with elongated openings 20 to accommodate the locking pins 19 when the crate is in its folded position, allowing the parts to be folded flat against one another.

It will thus be seen that I have hereby provided an egg crate which will be of extremely novel construction, and which may be folded into compact form when not in use.

What I claim is:

A folding crate comprising a bottom having upturned edges, sides and ends hinged to the upturned edges of said bottom, right angle extensions projecting from the side edges of the ends and adapted to receive the edges of the sides thereagainst, hook receiving loops carried by the sides upon the inside thereof, hooks carried by the extensions for engagement within the loops, tongues carried by the ends upon the inside thereof, tongue receiving plates carried by the sides upon the inside thereof and adapted to receive the tongues to hold the sides and ends in proper positions, a cover hinged to one of the sides, locking means carried by the cover and one of the sides to lock the cover upon the sides and ends when said sides and ends are connected, and a partition carried by one of the sides, said ends, sides, cover and partition being adapted to be folded upon the bottom, one of said sides being provided with slots for the accommodation of the locking means carried by the other side to allow the parts to be folded against one another.

In testimony whereof I have signed my name to this specification in the presence of two subscribing witnesses.

RANDEL PRIEST.

Witnesses:
   ARCHIE W. HEATH,
   FRANK FOX.